United States Patent [19]

Morishita et al.

[11] Patent Number: 4,481,157
[45] Date of Patent: Nov. 6, 1984

[54] METHOD AND APPARATUS FOR PRODUCTION OF MICROCAPSULES

[75] Inventors: Takashi Morishita, Nishinomiya; Hideki Sunohara, Osaka; Shohachi Tanoue, Amagasaki, all of Japan

[73] Assignee: Morishita Jintan Co., Ltd., Osaka, Japan

[21] Appl. No.: 372,299

[22] Filed: Apr. 27, 1982

[51] Int. Cl.³ .................. B01J 13/02; B28B 1/54; B29F 3/08
[52] U.S. Cl. ........................ 264/4.1; 264/4; 264/4.4; 425/5; 425/804; 428/402.2
[58] Field of Search ............ 264/4.4, 4, 4.1; 425/5, 425/804

[56] References Cited
U.S. PATENT DOCUMENTS

| | | | |
|---|---|---|---|
| 2,604,662 | 7/1952 | Bodkin | 252/315.6 X |
| 2,911,672 | 11/1959 | Van Erven Dorens et al. | 264/4 |
| 3,092,553 | 6/1963 | Fisher, Jr. et al. | 264/4.4 X |
| 4,028,024 | 6/1977 | Moreland | 425/804 X |
| 4,251,195 | 2/1981 | Suzuki et al. | 425/5 X |

Primary Examiner—Richard D. Lovering
Attorney, Agent, or Firm—Wegner & Bretschneider

[57] ABSTRACT

Apparatus for continuously producing microcapsules which comprises at least one inner pipe for extruding a material to be encapsulated, at least one outer pipe for extruding an encapsulating material, the outer pipe being coaxially arranged around the inner pipe, means for delivering the material to be encapsuled to the inner pipe, means for delivering the encapsulating material to the outer pipe, at least one capsule-forming cylinder through which a coaxial jet flow of the material to be encapsulated and encapsulating material flows downwardly and through which a coagulating agent is forced to flow downwardly, a closed chamber which contains the coagulating agent and in which the capsule-forming cylinder is arranged vertically and means for delivering the coagulating agent to the chamber, which produces up to about 50,000 microcapsules per second per a set of the inner and outer pipes and the capsule forming cylinder.

9 Claims, 5 Drawing Figures

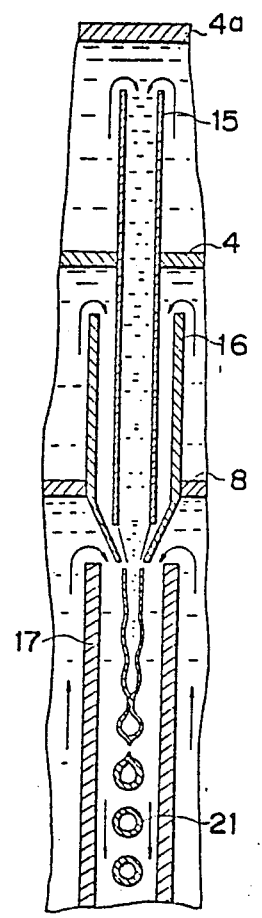
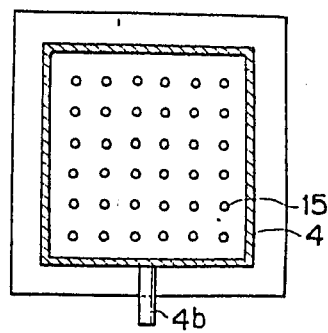
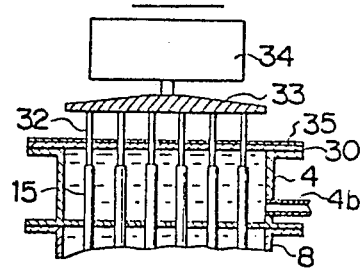
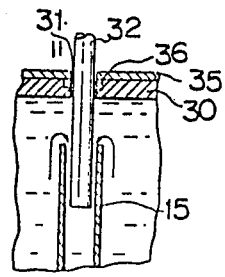

METHOD AND APPARATUS FOR PRODUCTION OF MICROCAPSULES

The present invention relates to a method and apparatus for the production of microcapsules.

U.S. Pat. No. 4,251,195 discloses an apparatus for producing miniature capsules having a capsule-forming orifice defined by open ends of two coaxial conduits. In the apparatus, coaxial composite jets of a liquid material to be encapsulated and an encapsulating material is introduced into a cooling liquid material, i.e. a coagulating material for the encapsulating material, which flows downwardly in a capsule-forming cylinder arranged just beneath the capsule-forming orifice. The flow velocity of the cooling material depends on the head of the cooling material contained in a cooler, i.e., an open top container. Therefore, the maximum flow velocity of the cooling material has its limit. This leads to the fact that the production rate of the capsules which depends on the flow velocity of the cooling material also has its limit. Further, very small capsules cannot be obtained since the size of the capsule is influenced by the flow velocity of the cooling material.

As a result of the extensive study, it has been found that when the coagulating agent for the encapsulating material is contained in a closed container and forced to flow in the capsule-forming cylinder, it is possible to make the flow velocity of the coagulating agent extremely high and to produce microcapsules at a great production rate which cannot be attained by the conventional methods.

According to one aspect of the present invention, there is provided a method for continuously producing microcapsules which comprises extruding a liquid material to be encapsulated from an orifice of an inner pipe and simultaneously extruding a liquid encapsulating material from an orifice of an outer pipe coaxially arranged around the inner pipe, and bleeding a coaxial jet flow of the material to be encapsulated as an inner flow and the encapsulating material as an outer flow into a flow of a coagulating agent for the encapsulating material in a capsule-forming cylinder arranged just beneath the orifice of the outer pipe, the coagulating agent being contained in a closed chamber and forced to flow in the capsule-forming cylinder.

In a preferred embodiment, the inner pipe, the outer pipe and the capsule-forming cylinder are arranged vertically, and the material to be encapsulated, the encapsulating material are extruded downwardly through the inner pipe and the outer pipe respectively.

According to another aspect of the present invention, there is provided an apparatus preferred to carry out the method of the present invention. The apparatus of the present invention comprises at least one inner pipe for extruding a material to be encapsulated, at least one outer pipe for extruding an encapsulating material, the outer pipe being coaxially arranged around the inner pipe, means for delivering the material to be encapsulated to the inner pipe, means for delivering the encapsulating material to the outer pipe, at least one capsule-forming cylinder through which a coaxial jet flow of material to be encapsulated and encapsulating material flows downwardly and through which a coagulating agent is forced to flow downwardly, a closed chamber which contains the coagulating agent and in which the capsule-forming cylinder is arranged vertically and means for delivering the coagulating agent to the chamber.

BRIEF DESCRIPTION OF DRAWINGS

The present invention will be described by way of the preferred embodiments with the reference to the accompanying drawings, wherein:

FIG. 2 shows formation of spherical microcapsules through the capsule-forming cylinder;

FIG. 3 is a plan view of the distributing chamber of the material to be encapsulated without the lid;

FIG. 4 is a sectional view of the oscillating apparatus, oscillating rods of which are inserted in the corresponding pipes for extruding the material to be encapsulated; and FIG. 5 shows an oscillating rod extending through the lid and inserted in the pipe for extruding the material to be encapsulated.

Figure 1:
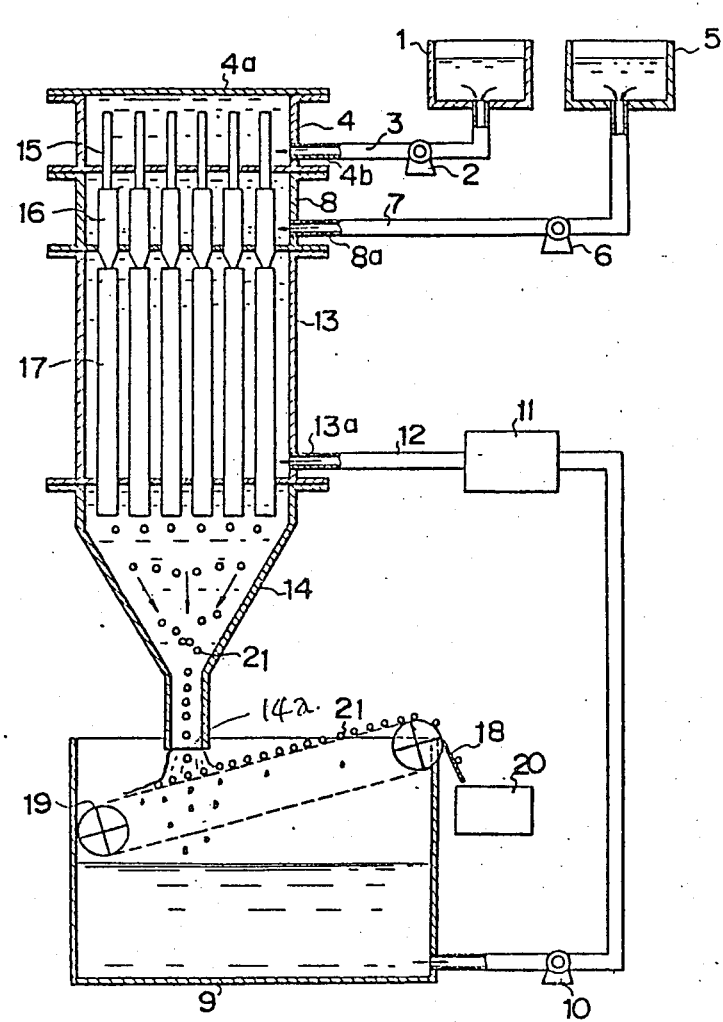
FIG. 1 is a side elevation view of one embodiment of the apparatus of the present invention.

Referring to the drawings, in FIG. 1, the apparatus comprises a chamber 4 for distributing a material to be encapsulated to inner pipes 15, a chamber 8 for distributing an encapsulating material to outer pipes 16, and a chamber 13 for distributing a coagulating agent to capsule-forming cylinders 17. The chamber 4 having the lid 4a is connected with the reservoir 1 through the pipe 3. The material to be encapsulated is supplied from the reservoir 1 to the chamber 4 through the pipe 3 and the inlet 4b by the fixed displacement pump 2 equipped with a variable speed gearing. In the same way, the chamber 8 is connected with the reservoir 5 through the pipe 7, and the encapsulating material is supplied from the reservoir 5 to the chamber 8 through the pipe 7 and the inlet 8a by the fixed displacement pump 6 equipped with a variable speed gearing.

The chamber 13 is filled with the coagulating agent, which is supplied from the reservoir 9 through the heat exchanger 11, the pipe 12 and the inlet 13a by a fixed displacement pump 10 equipped with a variable speed gearing. The temperature of the coagulating agent is controlled by the heat exchanger 11.

The chamber 4 which contains the material to be encapsulated is provided with thirty-six pipes 15 for extruding said material. The pipes 15 are arranged in six rows each having six pipes as shown in FIG. 3 and extend from the upper portion of the chamber 4 to the upper portion of the chamber 13 as shown in FIG. 2.

The chamber 8, which is placed under the chamber 4 and contains the encapsulating material, is provided with the pipes 16 for extruding the encapsulating material. The almost entire part of each pipe 16 coaxially surrounds the lower part of the corresponding pipe 15. The lower part of each pipe 16 extends through the bottom of the chamber 8 and into the interior of the chamber 13. The tapered lower end of the pipe 16 forms a capsule-forming orifice opening downwardly.

The chamber 13, which is placed under the chamber 8 and contains the coagulating agent, is provided with the capsule-forming cylinders 17. The chamber 13 is closed, and the coagulating agent flows in through the inlet 13a and flows out through the cylinders 17. The upper end of the cylinder 17 receives the orifice of the corresponding pipe 16. As is apparent from FIG. 1 and FIG. 2, the number and arrangement of the pipes 15 and 16 and the cylinders 17 are same, and the axes of the pipes 15 and 16 and of the cylinders 17 lie on the same vertical line.

The lower part of each cylinder 17 extends through the bottom of the chamber 13 and into the interior of the funnel 14. The lower opening 14a of the funnel 14 opens to the reservoir 9 containing the coagulating agent.

Over the reservoir 9, the net-like conveyer 19 is arranged to separate the formed microcapsules 21 from the coagulating agent. The microcapsules 21 on the conveyer 19 are scraped with the scraper 18 and drop into the container 20. Mesh size of the net conveyer 19 varies with the size of the formed capsules. The conveying speed may easily be adjusted to the production rate of the capsules.

Hereinafter, oscillating apparatus which may be attached to the above apparatus of the present invention will be described.

The oscillating apparatus is used only when the capsules are produced with the oscillation of the material to be encapsulated.

In FIG. 4, the lid 4a of the chamber 4 is replaced with the lid 30 having apertures, the number and arrangement of which are same as those of the pipes 15. The oscillating rods 32 penetrate the apertures. The upper ends of the rods are connected with the oscillating plate 33, and the lower ends of the rods are inserted in the upper ends of the pipes 15. The oscillating plate 33 is connected with the oscillator 34. The amplitude and frequency of oscillation may vary with the size of the capsules and/or the number of the capsules to be produced per unit time. In FIG. 5, the lower end of one of the oscillating rods 32 is inserted in the corresponding pipe 15. The sealing member 36 is provided around the rod 32 in the aperture 31 in order to prevent the leakage of the material to be encapsulated. The cover 35 prevents the displacement of the sealing member 36.

Now, the continuous mass production of the microcapsules by means of the apparatus of the present invention will be explained in detail.

In the following Examples, purified vegetable oil is used as a material to be encapsulated, a mixture of 20% by weight of gelatine, 2.2% by weight of sorbitol and 77.8% by weight of purified water is used as an encapsulating material, and liquid paraffin is used as a coagulating agent.

First, the chamber 4 and the chamber 8 are disassembled from the chamber 13. Volume of the coagulating agent discharged from the pump 10 is adjusted so that the circulating agent does not overflow the upper flange of the chamber 13. The temperature of the liquid paraffin is adjusted to a predetermined temperature by the heat-exchanger 11.

After the above provisions are completed, the purified vegetable oil is charged into the reservoir 1, and the mixture of gelatine, sorbitol and water into the reservoir 5. The vegetable oil is feeded to the chamber 4 through the pipe 2 and the inlet 4b by the pump 2 which is adjusted to discharge a predetermined volume of the oil. The mixture of gelatin, sorbitol and water is feeded to the chamber 8 through the pipe 7 and the inlet 8a by the pump 6 which is also adjusted to discharge a predetermined volume of the mixture. When the oil and the mixture fill the chambers 4 and 8 respectively and are extruded from the pipes 15 and 16 respectively, the chamber 8 is placed on the chamber 13, and the chamber 4 is placed on the chamber 8 so that the pipes 15 and 16 and the cylinders 17 are arranged as shown in FIG. 2. Then, the discharge of the pump 10 is adjusted to the predetermined volume. In the present invention, the discharge of the pump 10 can be adjusted to any volume since the chamber 13 is closed.

The vegetable oil filled in the chamber 4 is extruded through the thirty-six pipes 15 at a constant rate, and the mixture of gelatine, sorbitol and water is extruded through the thirty-six pipes 16 at a constant rate.

Then, the oil and the mixture meet in the region of the orifices of the pipes 16 and are bleeded as coaxial jet flows into downward streams of the liquid paraffin in the cylinders 17.

As going down in the stream of the paraffin, the coaxial jet flow of the oil and the mixture is gradually necked at intervals due to the interfacial tensions between the paraffin and the mixture and the mixture and the oil to form semispherical capsules. The semispherical capsules are cooled in the stream of the paraffin and form spherical seamless microcapsules 21.

The formed seamless microcapsules dispersed in the paraffin flow down into the funnel 14 and drop through the opening 14a onto the net-like conveyer 19. Mesh size of the net-like conveyer 19 must be smaller than the size of the microcapsules. The microcapsules are trapped and conveyed by the net, scraped by the scraper 18 and gathered in the container 20. The coagulating agent, i.e. the liquid paraffin passes through the net and recovered in the reservoir 9. The recovered coagulating agent is recycled to the chamber 13 through the pipe 12 and the heat-exchanger 11 by the pump 10.

Hereinafter, the production of the microcapsules by means of the apparatus of the invention equipped with the above described oscillating apparatus will be explained.

In this method, the oscillating apparatus comprising the oscillator 34, the oscillating plate 33 and the oscillating rods 32, the lid 30 having apertures and the sealing members 36 are attached to the chamber 4 in place of the lid 4a.

In the same manner as in the above method in which the oscillating apparatus is not used, the vegetable oil and the mixture of gelatin, sorbitol and purified water are filled in the chambers 4 and 8 respectively, and the chambers 4 and 8 are placed on the chamber 13. After the flow rate of the paraffin in the cylinder 17 is adjusted, the vegetable oil in the pipes 15 is oscillated with the rods 32 in order to obtain homogeneous size of microcapsules. Since the lower ends of the rods 32 are inserted in the pipes 15, the vegetable oil in the pipes 15 oscillates in accordance with the oscillation of the rods. Thus, the discharged volume of the vegetable oil from the lower ends of the pipes 15 increases or decreases. This variation in extruded volume of the oil influences the flows of the mixture of gelatin, sorbitol and water, and also the jet flows of the oil and the mixture so that the jet flows are necked at intervals in accordance with the oscillation of rods 32. The thus formed microcapsules are recovered in the same way as in the above described method. The method with the oscillation of the material to be encapsulated is preferred in the production of the microcapsule having a diameter larger than 1 mm.

EXAMPLES 1 to 5

Following the above described methods five kinds of microcapsules were produced. In these examples, thirty-six pipes 15 each having an inner diameter of 1.1 mm and an outer diameter of 1.5 mm and thirty-six pipes 16 each having an inner diameter of 2.0 mm and an outer diameter of 4.0 mm were used. The production conditions are listed in the following Table. In Examples 1 to 3, the oscillating apparatus was not used, on the contrary in Examples 4 and 5, the oscillating apparatus was used. The results are shown in Table.

TABLE

| Example | 1 | 2 | 3 | 4 | 5 |
| --- | --- | --- | --- | --- | --- |
| Flow rate of material to be encapsulated (g/min) | 6 | 23.8 | 795.8 | 2688 | 39760 |
| Flow rate of encapsulating material (g/min) | 5.2 | 20.8 | 697.3 | 2355 | 34835 |
| Average flow velocity of coagulating agent (cm/sec) | 300 | 300 | 100 | 50 | 50 |
| Diameter of dried capsule | 50$\mu$ | 100$\mu$ | 1 mm | 3 mm | 10 mm |
| Weight of dried capsule (mg/capsule) | $7.2 \times 10^{-5}$ | $5.76 \times 10^{-4}$ | $5.76 \times 10^{-1}$ | 15.5 | 575.6 |
| Frequency of oscillation (Hz) | — | — | — | 100 Hz | 40 Hz |
| Capsules/sec/36 orifices | $1.73 \times 10^6$ | $8.64 \times 10^5$ | $2.88 \times 10^4$ | $3.6 \times 10^3$ | $1.44 \times 10^3$ |

Lastly, important effects obtained by the method and apparatus of the present invention will be explained hereinafter.

(1) The flow velocity of the coagulating agent can easily be adjusted by the change of the gear of the fixed displacement pump and becomes so high as cannot be attained by the apparatus disclosed in U.S. Pat. No. 4,251,195.

(2) It is possible to produce capsules with a diameter ranging from 50$\mu$ to 10 mm.

(3) The method of the invention is continuous, and the production rate becomes very high. For example, by using 36 orifices, 1,730,000 microcapsules per second can be continuously produced.

We claim:

1. A continuous method for producing microcapsules which comprises extruding a liquid material to be encapsulated from an orifice of an inner pipe and simultaneously extruding a liquid encapsulating material from an orifice of an outer pipe coaxially arranged around the inner pipe, and bleeding a coaxial jet flow of the material to be encapsulated as an inner flow and the encapsulating material as an outer flow into a flow of a coagulating agent for the encapsulating material in a capsule-forming cylinder arranged just beneath the orifice of the outer pipe, the coagulating agent being contained in a closed chamber and forced to flow in the capsule-forming cylinder.

2. The method according to claim 1 which further comprises flowing the coagulating agent containing formed microcapsules into a funnel and separating the microcapsules from the coagulating agent by a net-like conveyer.

3. The method according to claim 1 or claim 2, wherein the encapsulating material is a mixture comprising gelatin, sorbitol and water.

4. The method according to claim 3, wherein the mixture comprises 20% by weight of gelatin, 2.2% by weight of sorbitol and 77.8% by weight of water.

5. The method according to claim 1 or claim 2, wherein the material to be encapsulated is vegetable oil.

6. The method according to claim 1 or claim 2, wherein the coagulating agent is liquid paraffin.

7. Apparatus for continuously producing microcapsules which comprises at least one inner pipe for extruding a material to be encapsulated, at least one outer pipe for extruding an encapsulating material, the outer pipe being coaxially arranged around the inner pipe, means for delivering the material to be encapsuled to the inner pipe, means for delivering the encapsulating material to the outer pipe, at least one capsule-forming cylinder through which a coaxial jet flow of the material to be encapsulated and encapsulating material flows downwardly and through which a coagulating agent is forced to flow downwardly, a closed chamber which contains the coagulating agent and in which the capsule-forming cylinder is arranged vertically and means for delivering the coagulating agent to the chamber.

8. Apparatus according to claim 7 which further comprises an oscillating rod which is inserted in the upper end of the inner pipe and means for oscillating the rod.

9. Apparatus according to claim 7 or claim 8 which further comprises a funnel placed downstream of the capsule-forming cylinder and a net-like conveyer placed beneath the lower opening of the funnel.

* * * * *